United States Patent
Inoue

(10) Patent No.: US 8,078,046 B2
(45) Date of Patent: Dec. 13, 2011

(54) IMAGE SENSING APPARATUS, CONTROL METHOD THEREFOR, PROGRAM, AND STORAGE MEDIUM

(75) Inventor: Koji Inoue, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 11/870,052

(22) Filed: Oct. 10, 2007

(65) Prior Publication Data

US 2008/0175577 A1    Jul. 24, 2008

(30) Foreign Application Priority Data

Oct. 26, 2006   (JP) .................. 2006-291720

(51) Int. Cl.
*G03B 13/34*   (2006.01)
(52) U.S. Cl. ........................... 396/121
(58) Field of Classification Search ........... 396/103, 396/121
See application file for complete search history.

(56) References Cited

U.S. PATENT DOCUMENTS

| | | | | |
|---|---|---|---|---|
| 5,130,735 A | * | 7/1992 | Kusaka et al. | 396/104 |
| 5,589,911 A | * | 12/1996 | Nonaka | 396/80 |
| 5,604,562 A | * | 2/1997 | Aoyama | 396/79 |
| 5,787,314 A | * | 7/1998 | Iwane | 396/95 |
| 6,175,692 B1 | * | 1/2001 | Onoda et al. | 396/104 |
| 7,469,099 B2 | | 12/2008 | Terayama | |
| 2006/0078323 A1 | * | 4/2006 | Nakahara | 396/127 |
| 2008/0122939 A1 | * | 5/2008 | Hirai | 348/222.1 |

FOREIGN PATENT DOCUMENTS

| | | |
|---|---|---|
| CN | 1713016 A | 12/2005 |
| JP | 60-060511 | 4/1985 |
| JP | 2003-131119 A | 5/2003 |

OTHER PUBLICATIONS

The above reference were cited in on Nov. 21, 2008 Chinese Office Action that issued in Chinese Patent Application 200710163752.X, which is enclosed with English Translation.

* cited by examiner

*Primary Examiner* — Clayton E Laballe
*Assistant Examiner* — Linda B Smith
(74) *Attorney, Agent, or Firm* — Cowan, Liebowitz & Latman, P.C.

(57) ABSTRACT

An image sensing apparatus includes a focus detection unit, determination unit, and selection unit. The focus detection unit includes a plurality of focus detection regions in a frame. The determination unit determines whether the focus detection unit has captured an object during servo autofocus in which the focus detection unit repeats focus detection even after obtaining an in-focus object image so that the focus follows motion of the object. The selection unit selects a focus detection region indicating the closest distance from the plurality of focus detection regions if the determination unit determines that the object has not been captured. The selection unit selects, as a focusing target, a focus detection region indicating a focus detection result nearest to the previous focus detection result from the plurality of focus detection regions if the determination unit determines that the object has been captured.

12 Claims, 9 Drawing Sheets

F I G. 2
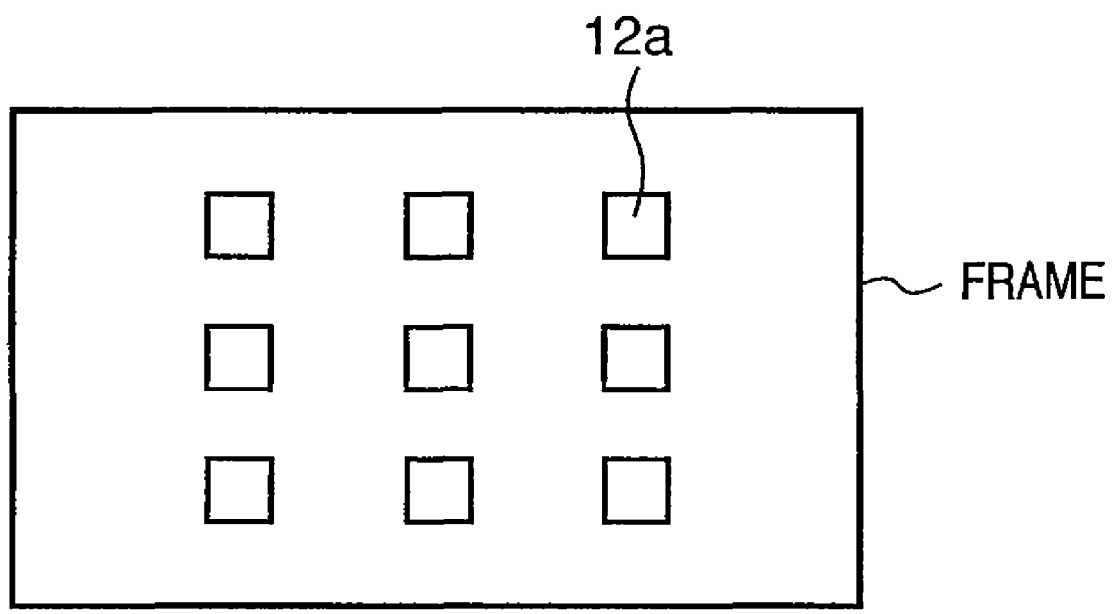

IMAGE SENSING APPARATUS, CONTROL METHOD THEREFOR, PROGRAM, AND STORAGE MEDIUM

BACKGROUND OF THE INVENTION

1. Field of the Invention

The present invention relates to an autofocus technique in an image sensing apparatus.

2. Description of the Related Art

In recent years, a single-lens reflex silver halide camera and digital camera having a plurality of focus detection sensors in a frame are becoming popular. Such cameras can focus on an object even at a position other than the center of the frame by prompting the photographer to select a sensor at an arbitrary position from a plurality of focus detection sensors or by automatically selecting an appropriate sensor.

Japanese Patent Laid-Open No. 60-60511 describes a known technique in which a camera automatically selects an appropriate focus detection sensor. This technique adopts, as a focus detection result, the output from one of a plurality of focus detection sensors, which indicates a closest distance.

In general, single-lens reflex cameras often have a single mode and servo mode as autofocus operation modes. In the single mode, once a camera focuses on an object, it locks the in-focus position. In the servo mode, the camera repeats focus detection even after obtaining an in-focus state so that the focus follows motion of the object.

Assume that the output from one of a plurality of focus detection sensors, which indicates a closest distance is selected as a focus detection result in the above-described way in the servo mode. When a non-target object cuts across in front of a target object, the focus position may shift to a non-target object despite the photographer's intention.

Consider, for example, a case wherein the photographer takes a photo by focusing on the face of a person who is spinning in a figure skating performance. When the hands of the person cut across in front of him/her, the focus position oscillates every time his/her hands cut across. Since the focus position in the viewfinder deviates during image capture, the photographer not only feels uncomfortable but also misses a good image capturing timing. This increases the possibility that the photo the photographer takes is a failure in which hands are undesirably focused.

Assume that the output from one of a plurality of focus detection sensors, which indicates an in-focus position nearest to the previous one is selected as a focus detection result (the neighborhood is prioritized). In this case, the following problem is posed. That is, focus detection may start from a relatively remote object in capturing a moving object. Then, the background may be focused without capturing a desired object on the focus detection sensor. In the neighborhood priority mode, the background may be kept focused even after another focus detection sensor captures an object. Therefore, the photographer must take the trouble of operating the focus detection start button again to capture the object.

SUMMARY OF THE INVENTION

The present invention has been made in consideration of the above problems, and has as its object to allow a photographer to continue focusing on a desired object in a servo AF (autofocus) mode.

In order to solve the above problems and to achieve the above object, according to the first aspect of the present invention, there is provided an image sensing apparatus comprising a focus detection unit including a plurality of focus detection regions in a frame, a determination unit configured to determine whether the focus detection unit has captured an object during servo autofocus in which the focus detection unit repeats focus detection even after obtaining an in-focus object image so that a focus follows motion of the object, and a selection unit configured to, when a focus detection region to be focused is selected from the plurality of focus detection regions, select a first focus detection region if the determination unit determines that the object has not been captured, and select, as a focusing target, a focus detection region indicating a second focus detection result nearer to a previous focus detection result than in the first focus detection region if the determination unit determines that the object has been captured.

According to the second aspect of the present invention, there is provided a method of controlling an image sensing apparatus comprising a focus detection unit including a plurality of focus detection regions in a frame, comprising a determination step of determining whether the focus detection unit has captured an object during servo autofocus in which the focus detection unit repeats focus detection even after obtaining an in-focus object image so that a focus follows motion of the object, and a selection step of, when a focus detection region to be focused is selected from the plurality of focus detection regions, selecting a first focus detection region if it is determined in the determination step that the object has not been captured, and selecting, as a focusing target, a focus detection region indicating a focus detection result nearer to a previous focus detection result than in the first focus detection region if it is determined in the determination step that the object has been captured.

Further features of the present invention will become apparent from the following description of exemplary embodiments with reference to the attached drawings.

BRIEF DESCRIPTION OF THE DRAWINGS

FIG. 2 is a view showing the layout of focus detection sensors in a frame;

DESCRIPTION OF THE EMBODIMENTS

Preferred embodiments of the present invention will be described in detail below with reference to the accompanying drawings.

Arrangement of Digital Camera Common to Each Embodiment

Figure 1:
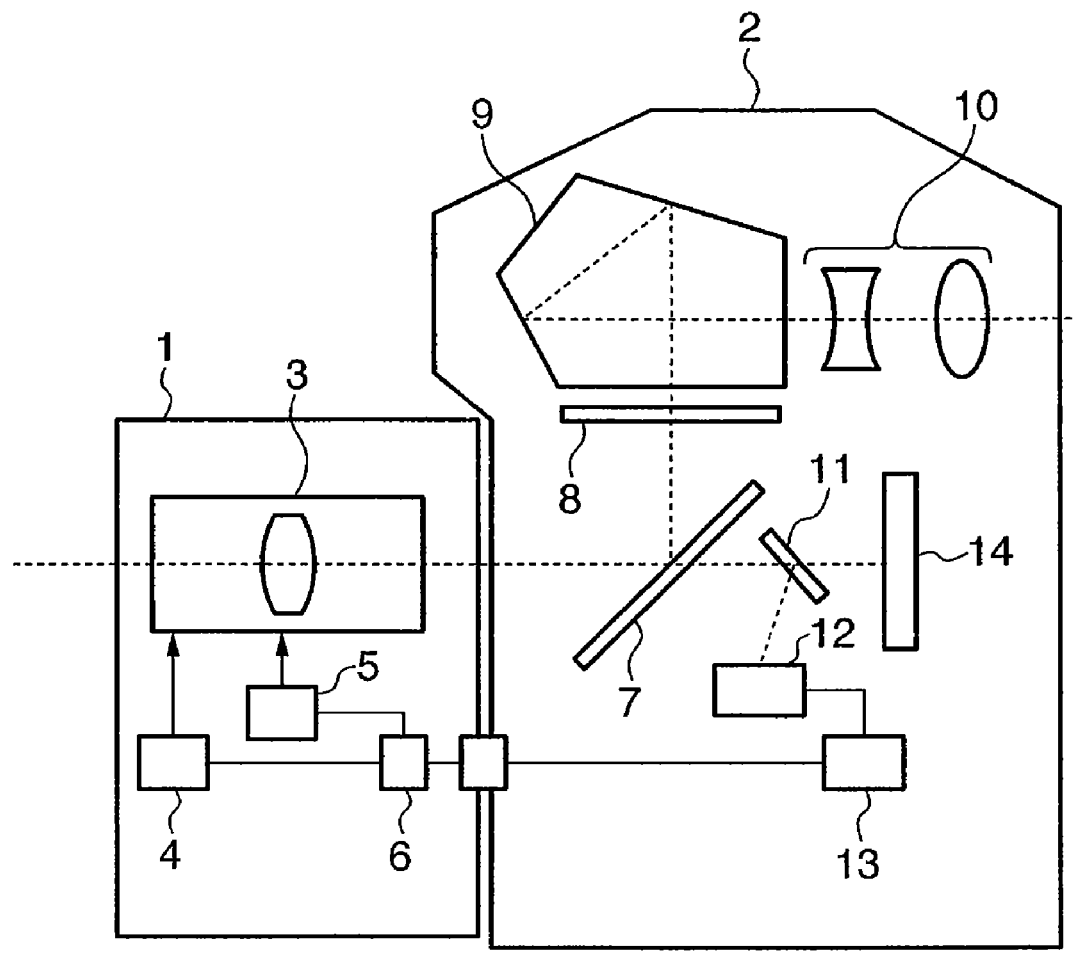
FIG. 1 is a view showing the arrangement of a single-lens reflex digital camera system common to each embodiment of the present invention.

FIG. 1 is a view showing the arrangement of a single-lens reflex digital camera system common to each embodiment of the present invention.

This camera system includes a photographing lens 1 and a single-lens reflex digital camera body (to be referred to as a camera body hereinafter) 2 from which the photographing lens 1 is detachable.

Referring to FIG. 1, the photographing lens 1 accommodates a photographing optical system 3 serving as an objective lens. The photographing optical system 3 includes one or a plurality of lenses, and can change the focal length or execute focus adjustment by moving all or some of these lenses. A focus adjusting unit 4 is built in the photographing lens 1 and is used for focus adjustment. A focus position detector 5 detects the position of a focus adjusting lens. A lens control unit 6 includes, for example, a CPU which controls the overall photographing lens 1.

Although not shown, the photographing lens 1 accommodates a zoom driving unit, a stop unit (not shown), and a detector. The zoom driving unit drives a variable magnification lens (not shown) of the photographing optical system 3, which is used to change the magnification. The detector detects the positions of the variable magnification lens and stop. The focus position detector 5 uses, for example, an electrode for an encoder built in a lens barrel which rotates or moves to move the focus adjusting lens in the optical axis direction, and a detection electrode which is in contact with the encoder electrode. This arrangement can output a signal corresponding to the position of the focus adjusting lens or the amount of movement from a reference position. However, the focus position detector 5 is not limited to this, and can use various kinds of detectors of, for example, an optical scheme and magnetic scheme.

The camera body 2 accommodates a main mirror 7 which can be inserted in or retracted from the image capturing optical path. The camera body 2 also accommodates a viewfinder optical system including a focusing glass 8, pentaprism 9, and eyepiece 10. An object image is formed on the focusing glass 8 with a light beam reflected upward by the main mirror 7 inserted in the image capturing optical path. The pentaprism 9 inverts the object image formed on the focusing glass 8.

A submirror 11 which downwardly guides the light beam transmitted through the main mirror 7 serving as a half mirror is arranged on the back surface of the main mirror 7 to be inserted in or retracted from the image capturing optical axis together with the main mirror 7. The camera body 2 also accommodates a focus detection unit 12 to which the light beam reflected by the submirror 11 is guided and which includes a plurality of focus detection sensors. Focus detection sensors (focus detection areas) 12a are laid but at a plurality of corresponding positions on the frame, as shown in FIG. 2. FIG. 2 illustrates an example in which the focus detection sensors are laid out at nine positions on the frame.

The camera body 2 also accommodates a camera control unit 13 and image sensing element 14. The camera control unit 13 controls the overall camera body 2. The image sensing element 14 is formed by, for example, a CCD or CMOS sensor which photoelectrically converts an object image formed by the photographing optical system 3.

The camera control unit 13 includes a phase difference in-focus determination unit which performs phase difference detection using a signal output from the focus detection unit 12 to determine whether the focus adjusting lens of the photographing optical system is in focus.

The focus detection unit 12 includes focus detection sensors having a plurality of focus detection lines. The camera control unit 13 adjusts the focus position by sending a detection result obtained by the focus detection unit 12 to the lens control unit 6.

The camera body 2 also includes a mode setting unit which sets a servo AF (autofocus) mode. In the servo AF mode, focus detection is repeated even after obtaining an in-focus state so that the focus follows object motion.

The camera control unit 13 includes an object capture determination unit which determines that an object has been captured, on the basis of the focus information obtained by focus detection unit 12 in the servo AF mode.

In this embodiment, although details will be described later, focus adjustment is done in a closest distance priority mode. In the closest distance priority mode, first, the output from one of the plurality of focus detection sensors (focus detection areas), which indicates a closest distance is selected as a focus detection result in the servo AF mode. If the object capture determination unit in the camera control unit 13 determines that the object has been captured, focus adjustment is performed by switching to a neighborhood priority mode. In the neighborhood priority mode, the output from a focus detection sensor (focus detection area) indicating an in-focus position nearest to the previous one is selected as a focus detection result.

Figure 3:
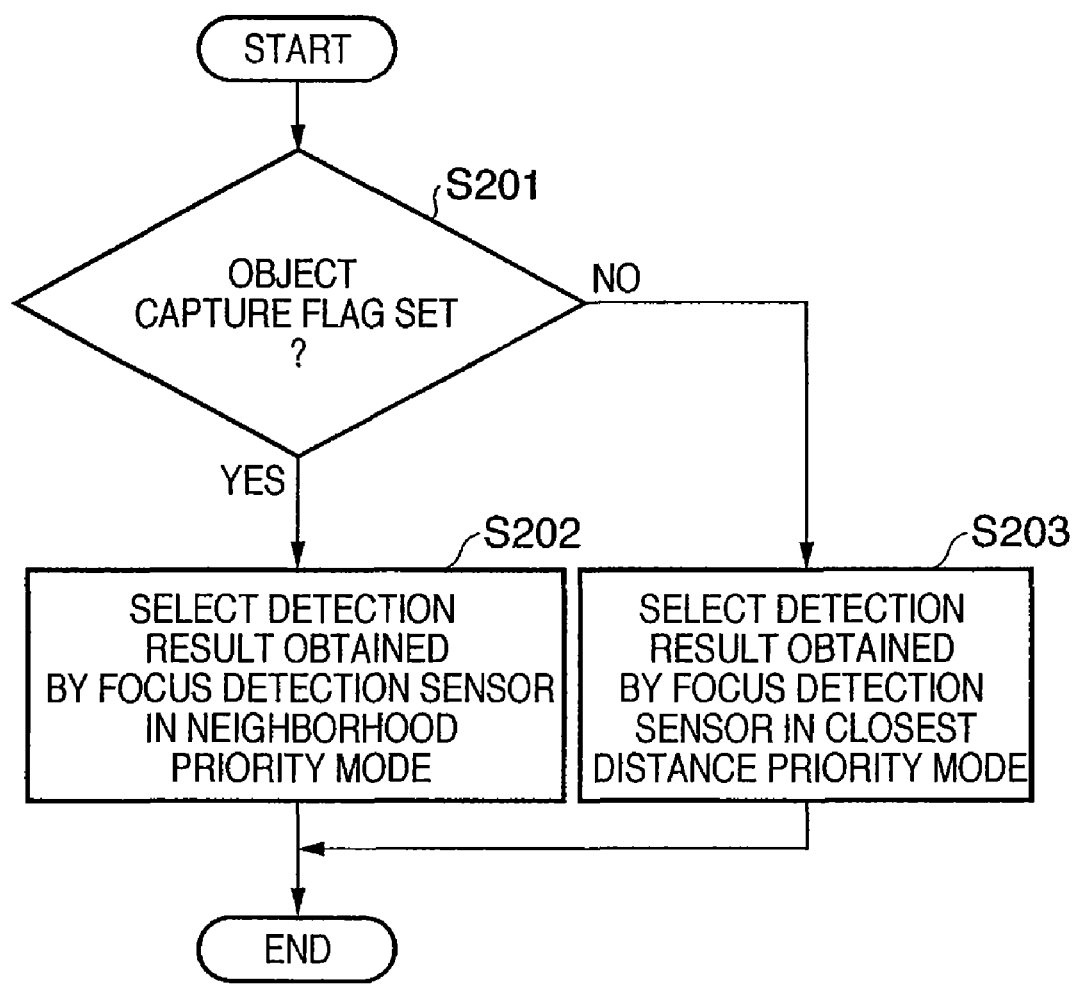
FIG. 3 is a flowchart illustrating how a camera control unit selects a detection result, obtained by one of a plurality of focus detection sensors, based on a determination result obtained by an object capture determination unit of the camera control unit in a servo AF mode.

FIG. 3 is a flowchart illustrating how the camera control unit 13 selects a detection result, obtained by one of the plurality of focus detection sensors, based on a determination result obtained by the object capture determination unit of the camera control unit 13 in the servo AF mode.

First, it is determined in step S201 whether an object capture flag (to be described later) is set. If YES in step S201, it is determined that an object has been captured and the process advances to step S202. If NO in step S201, it is determined that an object has not been captured and the process advances to step S203.

In step S202, since it is determined in step S201 that the object capture flag is set, a detection result obtained by a corresponding focus detection sensor is selected in the neighborhood priority mode. This means that a detection result obtained by one of the plurality of focus detection sensors, which indicates an in-focus position nearest to the previous one is selected.

In step S203, since the object capture flag is not set, a detection result obtained by a corresponding focus detection sensor is selected in the closest distance priority mode. This means that a detection result obtained by a focus detection sensor indicating a closest distance is selected from those obtained by the plurality of focus detection sensors.

As is obvious from the flowchart shown in FIG. 3, the object has not been captured immediately after the servo AF operation. For this reason, the object capture flag is not set in step S201 and the process advances to step S203 to select the closest distance priority mode. That is, in this embodiment, the servo AF operation starts in the closest distance priority mode as the initial state.

A procedure for causing the object capture determination unit in the camera control unit 13 to determine that an object has been captured will be explained next.

First Embodiment

Figure 4:
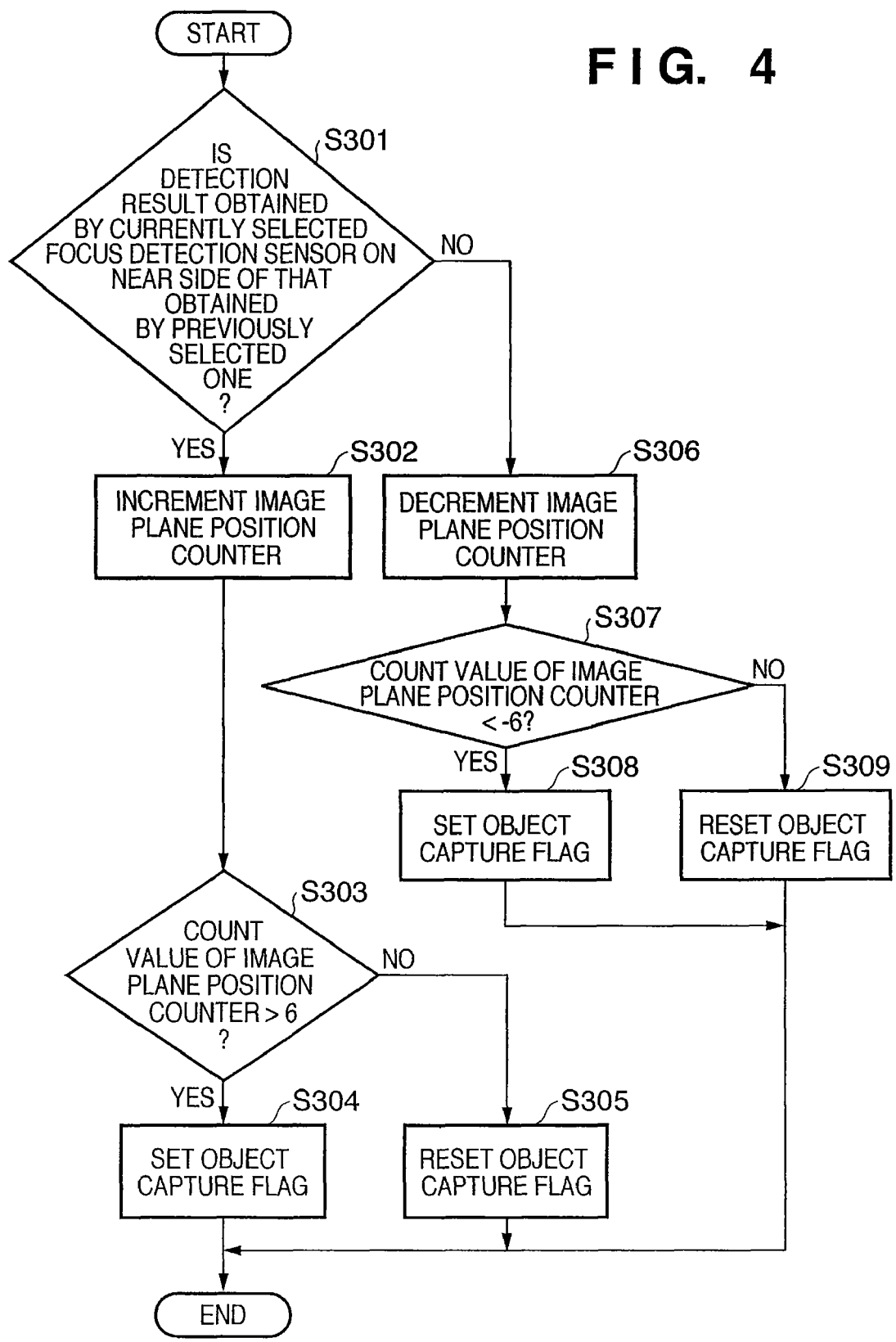
FIG. 4 is a flowchart illustrating a procedure for causing an object capture determination unit in a camera control unit to determine that an object has been captured according to the first embodiment.

FIG. 4 is a flowchart illustrating a procedure for causing an object capture determination unit in a camera control unit 13 to determine that an object has been captured according to the first embodiment.

The closest distance priority mode is selected at the start point of the flowchart.

First, it is determined in step S301 in the closest distance priority mode whether the detection result obtained by the currently selected focus detection sensor is on the near side of that obtained by the previously selected one. If YES in step S301, the process advances to step S302. If NO in step S301, the process advances to step S306. Near/far side determination may be performed by using an actual focus detection result or by driving the focus detection unit in a predetermined direction.

In step S302, since it is determined that the detection result obtained by the currently selected focus detection sensor is on the near side of that obtained by the previously selected one, an image plane position counter is incremented by 1 and the process advances to step S303. This image plane position counter counts up when focus detection sensors on the near side continuously output detection results, while it counts down when focus detection sensors on the far side continuously output detection results. Although not shown in FIG. 4, the image plane position counter is cleared when focus detection sensors on the near or far side do not continuously output detection results.

In step S303, the count value of the image plane position counter is determined. If the count value is larger than 6, the process advances to step S304; otherwise, the process advances to step S305. That the count value of the image plane position counter is larger than 6 means that an object is gradually getting close. Hence, the object has been captured. This determination value "6" is used as a criterion for determining that the object has been captured. As this value decreases, it can be more quickly determined that the object has been captured. This, however, lowers the accuracy of the determination as to whether the object has been really captured. As this value increases, the determination as to whether the object has been captured requires a longer period of time but its accuracy increases. The photographer can change this value to his/her liking based on, for example, the frame speed and the detection cycle of a focus detection sensor of a camera used. In addition, a function of allowing the photographer to set whether to increment and decrement this value may be prepared.

In step S304, since it is determined in step S303 that the object has been captured, the object capture flag is set and the object capture determination operation ends.

In step S305, since it is determined in step S303 that the object has not been captured, the object capture flag is reset and the object capture determination operation ends.

In step S306, since it is determined in step S301 that the detection result obtained by the currently selected focus detection sensor is on the far side of that obtained by the previously selected one, the image plane position counter is decremented by 1 and the process advances to step S307.

In step S307, object capture determination is performed by determining the count value of the image plane position counter. If the count value of the image plane position counter is smaller than −6, the process advances to step S308; otherwise, the process advances to step S309. That the count value of the image plane position counter is smaller than −6 means that an object is gradually moving away. Hence, the object has been captured.

In step S308, since it is determined in step S307 that the object has been captured, the object capture flag is set and the object capture determination operation ends.

In step S309, since it is determined in step S307 that the object has not been captured, the object capture flag is reset and the object capture determination operation ends.

With the above-described operations, it is determined whether to set or reset the object capture flag. This result is used as a criterion in step S201 of FIG. 3.

Second Embodiment

In the second embodiment, it is determined that an object has been captured by detecting that the ratio of image plane moving velocity between the previous focus detection and the current focus detection falls within a predetermined range in the closest priority mode.

Normally, the difference in image plane moving velocity between the previous detection result and the current detection result becomes nearly zero while the object image plane moves at a constant velocity. Since the object image plane continuously, smoothly moves while the image plane moving velocity continuously changes, it can be determined that the continuity (identity) of the object is maintained. If this value rapidly changes, a phenomenon which inhibits the object from being captured has occurred, for example, the object has drastically changed, the photographer has selected another object, or another object has cut across.

Figure 5:
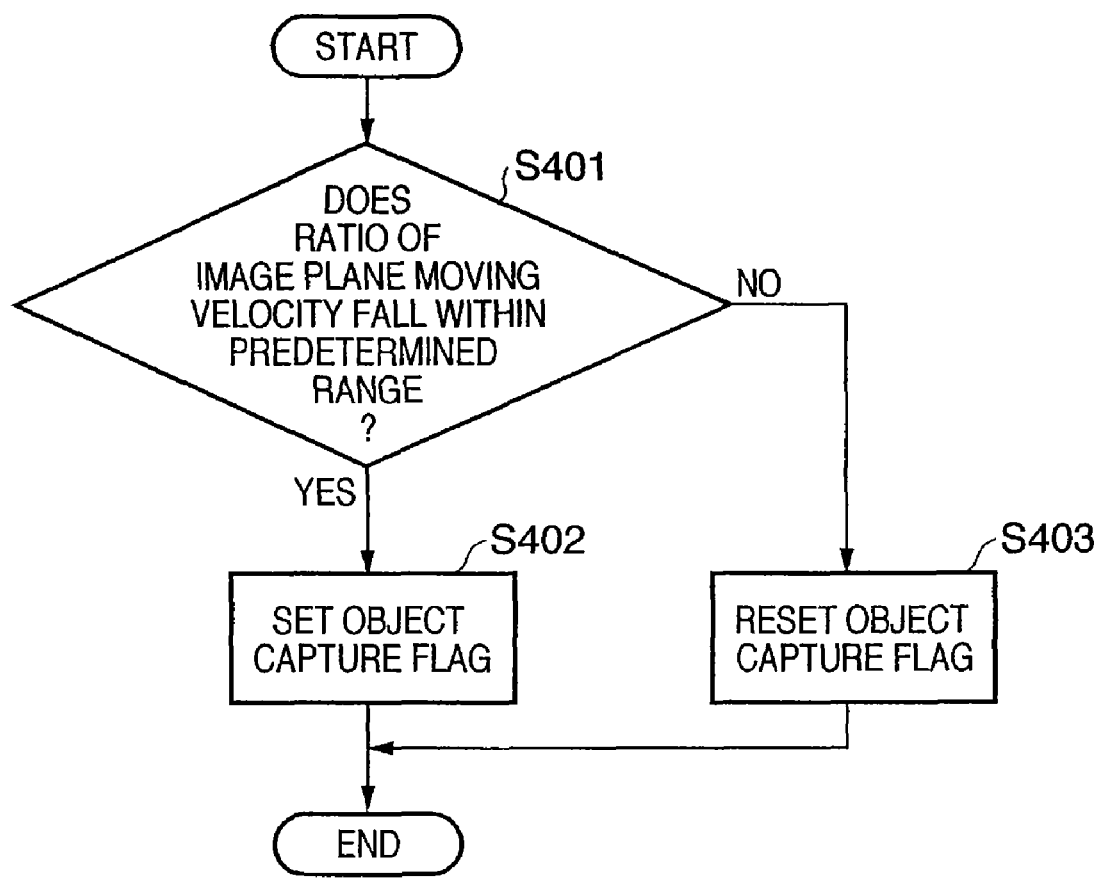
FIG. 5 is a flowchart illustrating a procedure for causing an object capture determination unit in a camera control unit to determine that an object has been captured according to the second embodiment.

FIG. 5 is a flowchart illustrating a procedure for causing an object capture determination unit in a camera control unit 13 to determine that an object has been captured according to the second embodiment.

The closest distance priority mode is selected at the start point of the flowchart.

In step S401, the ratio of image plane moving velocity between the previous focus detection and the current focus detection is calculated to determine whether the calculation result falls within a predetermined range. If YES in step S401, it is determined that that the object has been captured and the process advances to step S402. If NO in step S401, it is determined that the object has not been captured and the process advances to step S403. As the threshold value of this predetermined range decreases, object capture determination is performed with a higher sensitivity to changes in motion of the object. As the threshold value of this predetermined range increases, determination is performed with a lower sensitivity to changes in object motion. The photographer can change this value to his/her liking based on, for example, the frame speed and the detection cycle of a focus detection sensor of a camera used. In addition, a function of allowing the photographer to set whether to increment and decrement this value may be prepared.

In step S402, since it is determined in step S401 that the object has been captured, the object capture flag is set and the object capture determination operation ends.

In step S403, since it is determined in step S401 that the object has not been captured, the object capture flag is reset and the object capture determination operation ends.

Third Embodiment

In the third embodiment, it is determined that an object has been captured by detecting that a focus detection sensor used to obtain a final focus detection result does not change a predetermined number of times or more.

Figure 6:
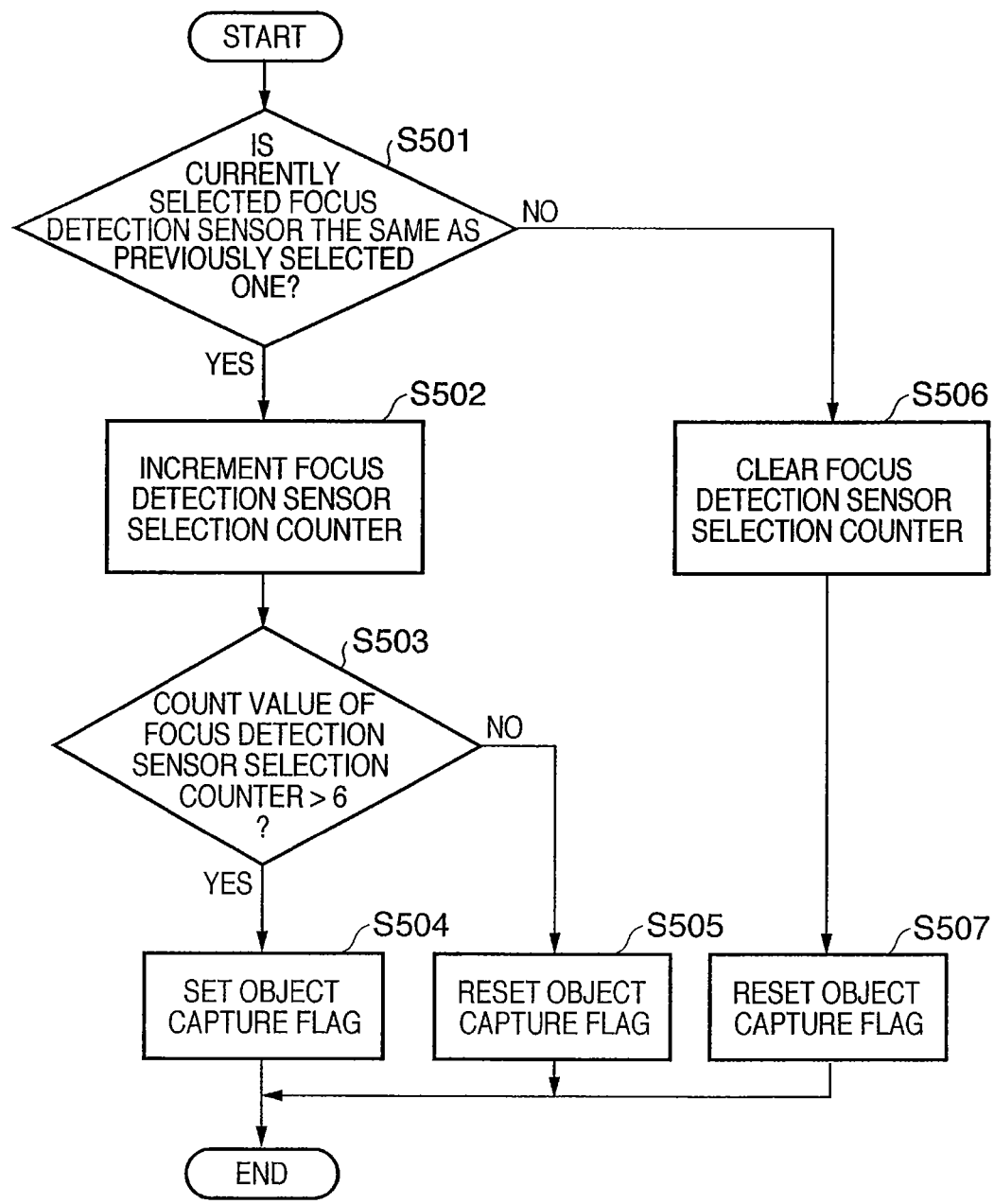
FIG. 6 is a flowchart illustrating a procedure for causing an object capture determination unit in a camera control unit to determine that an object has been captured according to the third embodiment.

FIG. 6 is a flowchart illustrating a procedure for causing an object capture determination unit in a camera control unit 13 to determine that an object has been captured according to the third embodiment.

The closest distance priority mode is selected at the start point of the flowchart.

First, if it is determined in step S501 that the currently selected focus detection sensor is the same as the previously selected one, the process advances to step S502. Otherwise, the process advances to step S506.

In step S502, since it is determined in step S501 that the currently selected focus detection sensor is the same as the previously selected one, a focus detection sensor selection counter is incremented by 1 and the process advances to step S503.

If it is determined in step S503 that the count value of the focus detection sensor selection counter is larger than 6, the process advances to step S504. Otherwise, the process advances to step S505. If the count value of the image plane position counter is larger than 6, the object has been captured. This determination value "6" is used as a criterion for determining that the object has been captured. As this value decreases, it can be more quickly determined that the object has been captured. This, however, lowers the accuracy of the determination as to whether the object has been really captured. As this value increases, the determination as to whether the object has been captured requires a longer period of time but its accuracy increases. The photographer can change this value to his/her liking based on, for example, the frame speed and the detection cycle of a focus detection sensor of a camera used. In addition, a function of allowing the photographer to set whether to increment and decrement this value may be prepared.

In step S504, since it is determined in step S503 that the object has been captured, the object capture flag is set.

In step S505, since it is determined in step S503 that the object has not been captured, the object capture flag is reset.

In step S506, since it is determined in step S501 that the currently selected focus detection sensor is different from the previously selected one, object capture has failed. Then, the focus detection sensor selection counter is cleared.

In step S507, since it is determined in step S501 that the currently selected focus detection sensor is different from the previously selected one, object capture has failed. Then, the object capture flag is reset.

Fourth Embodiment

In the fourth embodiment, it is determined that an object has been captured by detecting that final focus detection results continuously fall within a predetermined range.

Figure 7:
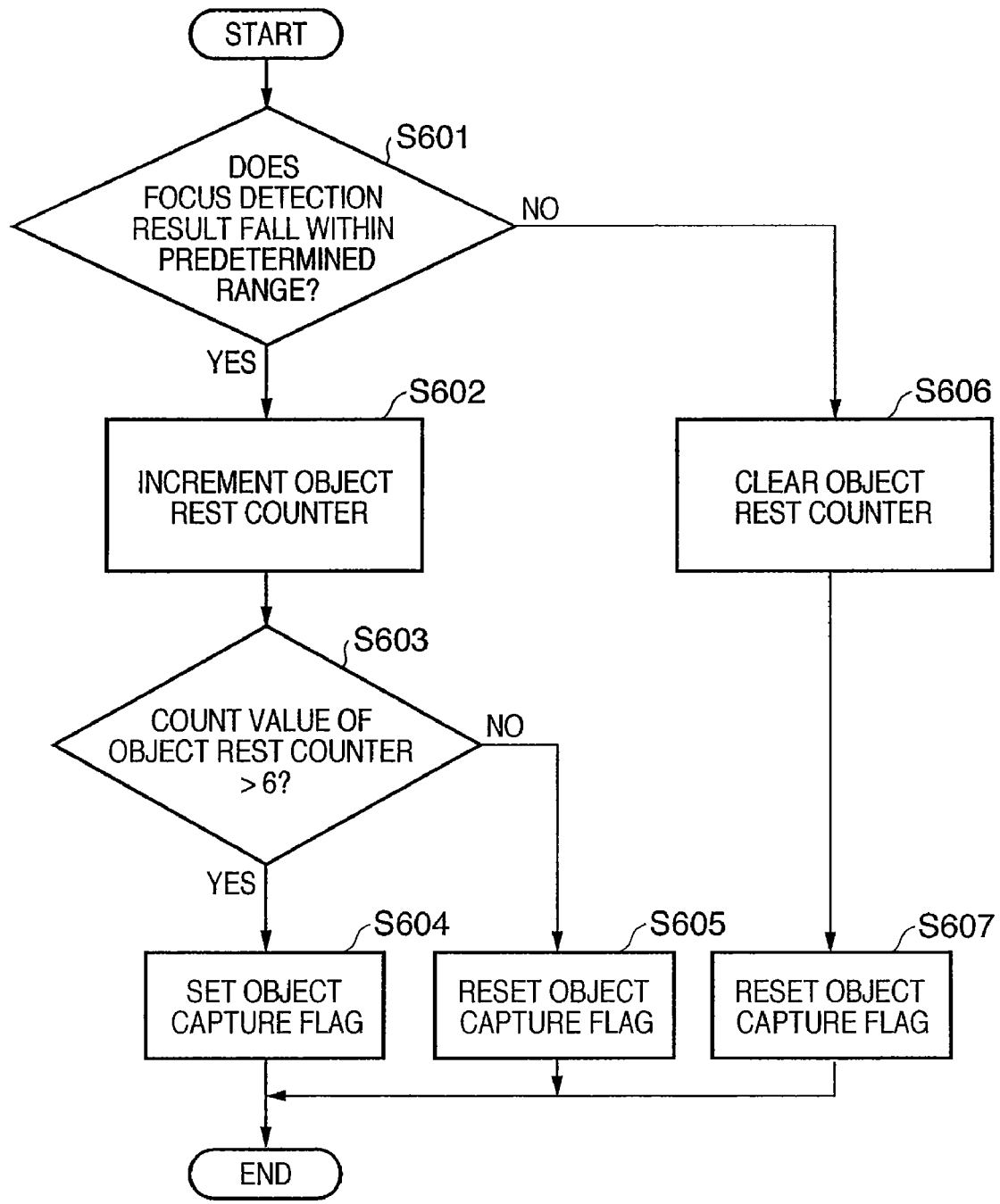
FIG. 7 is a flowchart illustrating a procedure for causing an object capture determination unit in a camera control unit to determine that an object has been captured according to the fourth embodiment.

FIG. 7 is a flowchart illustrating a procedure for causing an object capture determination unit in a camera control unit 13 to determine that an object has been captured according to the fourth embodiment.

The closest distance priority mode is selected at the start point of the flowchart.

First, if it is determined in step S601 that the current focus detection result falls within a predetermined range with respect to the previous one, the process advances to step S602. Otherwise, the process advances to step S606. The value that falls within this predetermined range is used as a criterion for determining an object at rest or in a slight motion. As this value decreases, an object at rest can be more readily determined. As this value increases, a range in which an object slightly moves can be determined widens.

In step S602, since it is determined in step S601 that the focus detection result falls within the predetermined range, an object rest counter is incremented by 1.

It is determined in step S603 whether the count value of the object rest counter is larger than 6. If YES in step S603, the process advances to step S604. If NO in step S603, the process advances to step S605. If the count value of the object rest counter is larger than 6, the object continuously moves in small amounts. Hence, the object has been captured. This determination value "6" is used as a criterion for determining that the object has been captured. As this value decreases, it can be more quickly determined that the object has been captured. This, however, lowers the accuracy of the determination as to whether the object has been really captured. As this value increases, the determination as to whether the object has been captured requires a longer period of time but its accuracy increases. The photographer can change this value to his/her liking based on, for example, the frame speed and the detection cycle of a focus detection sensor of a camera used. In addition, a function of allowing the photographer to set whether to increment and decrement this value may be prepared.

In step S604, since it is determined in step S603 that the object has been captured, the object capture flag is set.

In step S605, since it is determined in step S603 that the object has not been captured, the object capture flag is reset.

In step S606, since it is determined in step S601 that the current focus detection result does not fall within the predetermined range with respect to the previous one, the object rest counter is cleared.

In step S607, since it is determined in step 5601 that the current focus detection result does not fall within the predetermined range with respect to the previous one, object capture has failed. Then, the object capture flag is reset.

Fifth Embodiment

In the fifth embodiment, it is determined that an object has been captured by detecting that the output results from an acceleration sensor continuously fall within a predetermined range. In the fifth embodiment, an acceleration sensor (not shown) is additionally built in a camera body 2.

Figure 8:
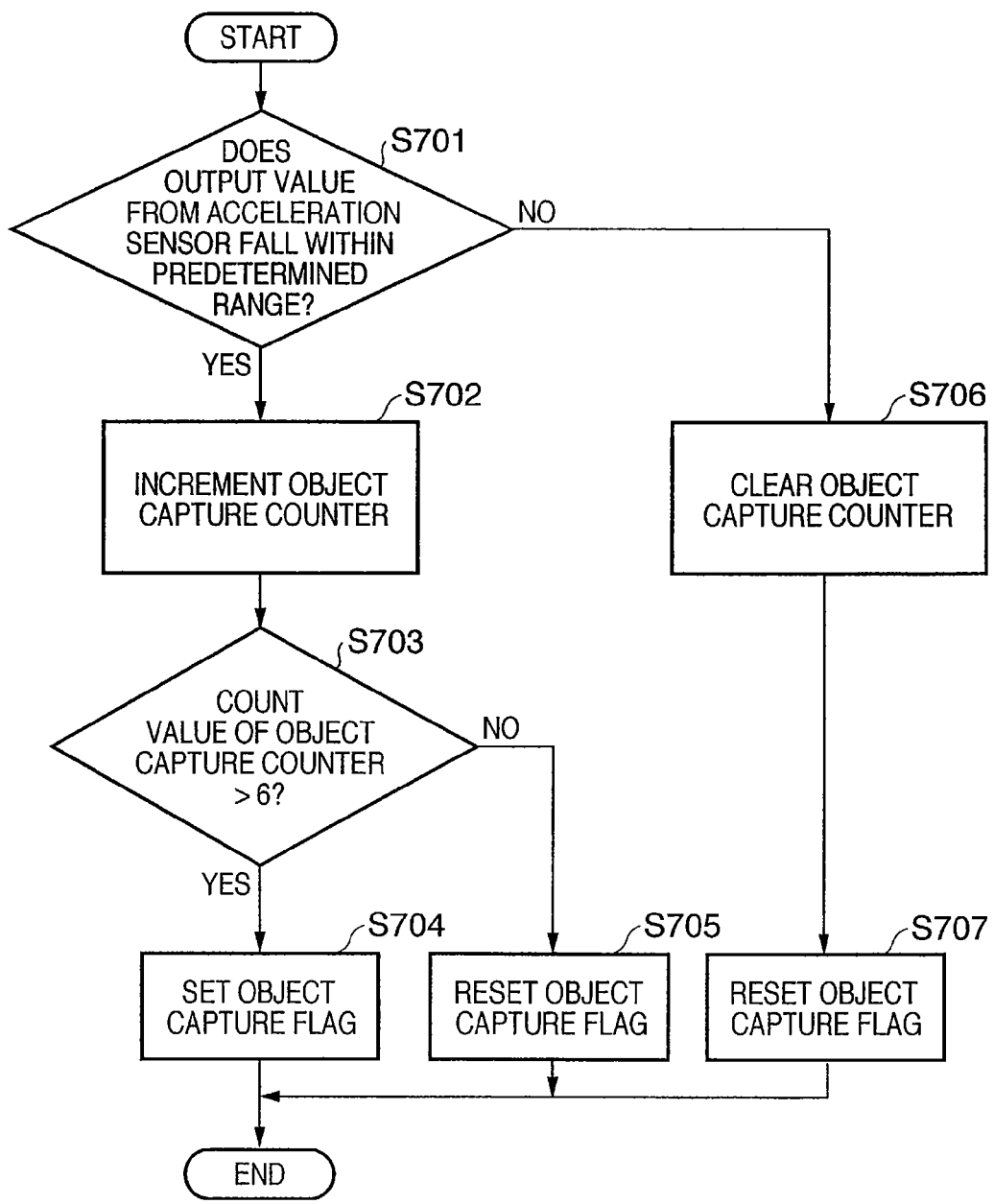
FIG. 8 is a flowchart illustrating a procedure for causing an object capture determination unit in a camera control unit to determine that an object has been captured according to the fifth embodiment.

FIG. 8 is a flowchart illustrating a procedure for causing an object capture determination unit in a camera control unit 13 to determine that an object has been captured according to the fifth embodiment.

The closest distance priority mode is selected at the start point of the flowchart.

First, it is determined in step S701 whether the output result from the acceleration sensor built in the camera body 2 falls within a predetermined range. The output result from the acceleration sensor has a large value when the photographer aims his/her camera at an object, while it has a small value while the camera stably captures the object. When the photographer aims to change the object or capture the object moving vigorously from a stable image capture state, the acceleration sensor outputs a large value. That is, when the output results from the acceleration sensor continuously fall within the predetermined range, the object has been captured.

A threshold value for determining whether the output results from the acceleration sensor fall within the predetermined range is determined by taking these values into consideration. Since the output result from the acceleration sensor depends on the motion of the photographer, a function of allowing the photographer to set sensor sensitivity to his/her liking may be prepared.

In step S702, since it is determined in step S701 that the output result from the acceleration sensor falls within the predetermined range, an object capture counter is incremented by 1 and the process advances to step S703.

It is determined in step S703 whether the count value of the object capture counter is larger than 6. If YES in step S703, the process advances to step S704. If NO in step S703, the process advances to step S705. This determination value "6" is used as a criterion for determining that the object has been captured. As this value decreases, it can be more quickly determined that the object has been captured. This, however, lowers the accuracy of the determination as to whether the object has been really captured. As this value increases, the determination as to whether the object has been captured requires a longer period of time but its accuracy increases. The photographer can change this value to his/her liking based on, for example, the frame speed and the detection cycle of a focus detection sensor of a camera used. In addition, a function of allowing the photographer to set whether to increment and decrement this value may be prepared.

In step S704, since it is determined in step S703 that the object has been captured, the object capture flag is set and the object capture determination operation ends.

In step S705, since it is determined in step S703 that the object has not been captured, the object capture flag is reset and the object capture determination operation ends.

In step S706, since it is determined in step S701 that the output result from the acceleration sensor does not fall within the predetermined range, it is determined that the object has not been captured. Then, the object capture counter is cleared and the process advances to step S707.

In step S707, since it is determined in step S701 that the output result from the acceleration sensor does not fall within the predetermined range, it is determined that the object has not been captured. Then, the object capture flag is cleared and the object capture determination operation ends.

Sixth Embodiment

In the sixth embodiment, an object capture button (not shown) is additionally provided to a camera body 2. The photographer operates the object capture button when he/she has captured an object. This operation result is sent to a camera control unit 13.

In the sixth embodiment, it is determined that an object has been captured by detecting that the photographer has operated the object capture button.

Figure 9:
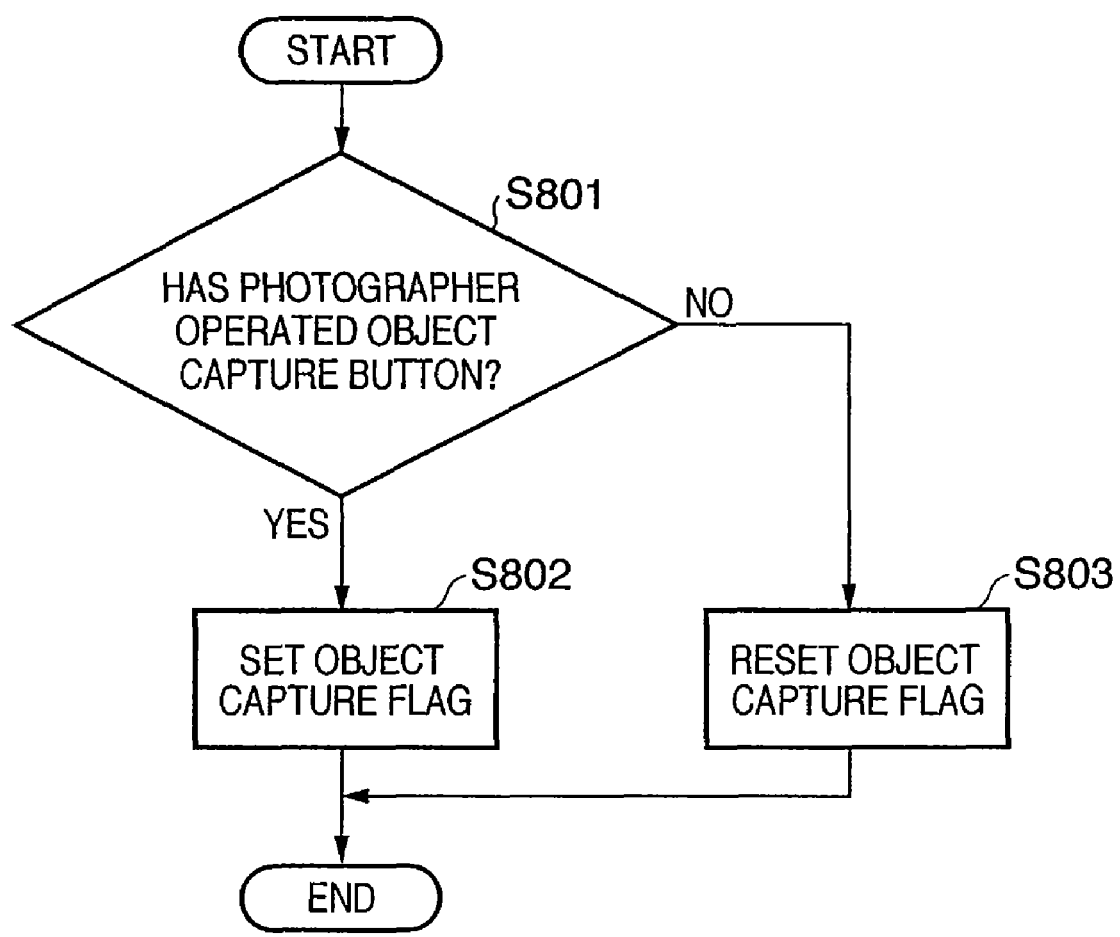
FIG. 9 is a flowchart illustrating a procedure for causing an object capture determination unit in a camera control unit to determine that an object has been captured according to the sixth embodiment.

FIG. 9 is a flowchart illustrating a procedure for causing an object capture determination unit in the camera control unit 13 to determine that an object has been captured according to the sixth embodiment.

The closest distance priority mode is selected at the start point of the flowchart.

First, it is determined in step S801 whether the photographer has operated the object capture button. If YES in step S801, the process advances to step S802. If NO in step S801, the process advances to step S803.

In step S802, since it is determined in step S801 that the photographer has operated the object capture button, the object capture flag is set and the object capture determination operation ends.

In step S803, since it is determined in step S801 that the photographer has not operated the object capture button, the object capture flag is reset and the object capture determination operation ends.

As has been explained above, according to the above-described embodiments, a focus detection sensor is selected in the closest distance priority mode before object capture, and another focus detection sensor is selected in the neighborhood priority mode after object capture. This makes it possible to focus on a target object without any influence of non-target objects. It is therefore possible to continue capturing of a target object without oscillation of the focus position even when a non-target object cuts across in front of the target object. Consequently, the photographer can comfortably capture an image which is in focus on his/her desired position at an appropriate timing without oscillation of the focus position in the viewfinder during image capture.

Other Embodiment

The object of each embodiment is achieved even by the following method. That is, a storage medium (or recording medium) which records software program codes for implementing the functions of the above-described embodiments is supplied to the system or apparatus. The computer (or CPU or MPU) of the system or apparatus reads out and executes the program codes stored in the storage medium. In this case, the program codes read out from the storage medium implement the functions of the above-described embodiments by themselves, and the storage medium which stores the program codes constitutes the present invention. In addition to the case in which the functions of the above-described embodiments are implemented when the computer executes the readout program codes, the present invention incorporates the following case. That is, the functions of the above-described embodiments are implemented when the operating system (OS) running on the computer performs part or all of actual processing based on the instructions of the program codes.

The present invention also incorporates the following case. That is, the program codes read out from the storage medium are written in the memory of a function expansion card inserted into the computer or a function expansion unit connected to the computer. After that, the functions of the above-described embodiments are implemented when the CPU of the function expansion card or function expansion unit performs part or all of actual processing based on the instructions of the program codes.

When the present invention is applied to the storage medium, it stores program codes corresponding to the above-described procedures.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-291720, filed Dec. 26, 2006 which is hereby incorporated by reference herein in its entirety.

What is claimed is:

1. An image sensing apparatus comprising:
a focus detection unit including a plurality of focus detection regions in a frame;
a determination unit configured to determine whether said focus detection unit has captured an object during servo autofocus in which said focus detection unit repeats focus detection even after obtaining an in-focus object image so that a focus follows motion of the object; and
a selection unit configured to, when a focus detection region to be focused is selected from said plurality of focus detection regions, select a first focus detection region if said determination unit determines that the object has not been captured, and select a second focus detection region if said determination unit determines that the object has been captured, wherein the first focus detection region is a focus detection region which is selected by prioritizing an object nearer to said image sensing apparatus, and the second focus detection region is a focus detection region which indicates information corresponding to an object distance nearer to an object distance of previous focus detection operation.

2. The apparatus according to claim 1, wherein said determination unit determines that said focus detection unit has captured the object when a change in object image plane position is one of a continuous monotonic increase and monotonic decrease.

3. The apparatus according to claim 1, wherein said determination unit determines that said focus detection unit has captured the object when a ratio of a previous object image plane moving velocity to a current object image plane moving velocity falls within a predetermined range.

4. The apparatus according to claim 1, wherein said determination unit determines that said focus detection unit has captured the object when a focus detection region used for focus detection does not change a predetermined number of times or more.

5. The apparatus according to claim 1, wherein said determination unit determines that said focus detection unit has captured the object when focus detection results continuously fall within a predetermined range.

6. The apparatus according to claim 1, further comprising an acceleration sensor,
wherein said determination unit determines that said focus detection unit has captured the object when output results from said acceleration sensor continuously fall within a predetermined range.

7. The apparatus according to claim 1, further comprising an object capturing operation member,
wherein said determination unit determines that said focus detection unit has captured the object when a photographer has operated said object capturing operation member.

8. The apparatus according to claim 1, wherein said first focus detection region indicates a closest distance of said plurality of focus detection regions.

9. The apparatus according to claim 1, wherein said second focus detection region indicates a detection result nearest to a previous focus detection result of said plurality of focus detection regions.

10. A method of controlling an image sensing apparatus comprising a focus detection unit including a plurality of focus detection regions in a frame, comprising:
a determination step of determining whether the focus detection unit has captured an object during servo autofocus in which the focus detection unit repeats focus detection even after obtaining an in-focus object image so that a focus follows motion of the object; and
a selection step of, when a focus detection region to be focused is selected from the plurality of focus detection regions, selecting a first focus detection region if it is determined in the determination step that the object has not been captured, and selecting a second focus detection region if it is determined in the determination step that the object has been captured, wherein the first focus detection region is a focus detection region which is selected by prioritizing an object nearer to said image sensing apparatus, and the second focus detection region is a focus detection region which indicates information corresponding to an object distance nearer to an object distance of previous focus detection operation.

11. A program causing a computer to execute a control method defined in claim 10.

12. A computer-readable storage medium storing a program defined in claim 11.

* * * * *